Figure 1:
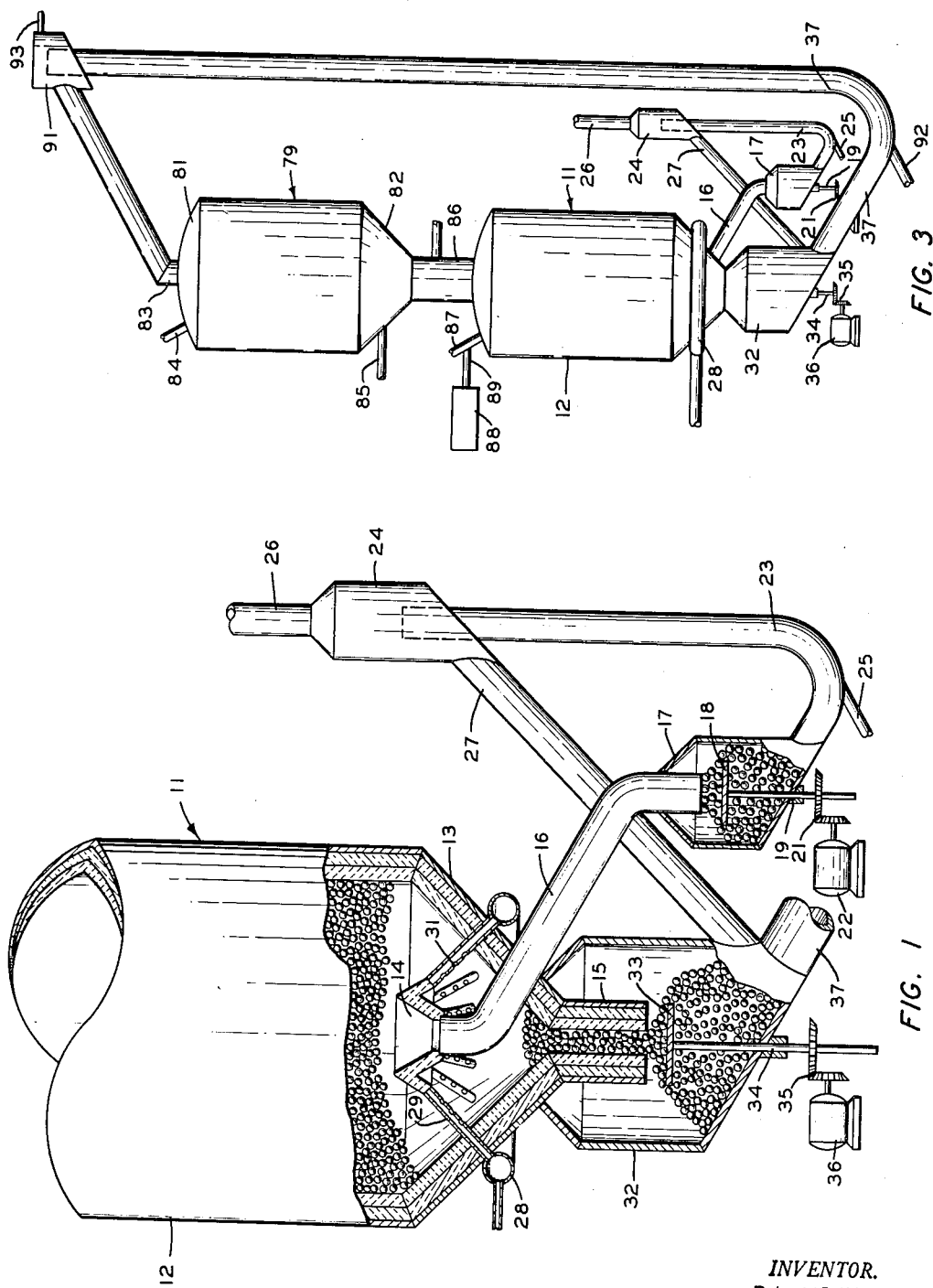

June 19, 1956

R. L. McINTIRE 2,751,212

PEBBLE HEAT EXCHANGE CHAMBER

Filed Dec. 26, 1951

2 Sheets-Sheet 1

INVENTOR.
R.L. MC INTIRE
BY Hudson and Young
ATTORNEYS

June 19, 1956  R. L. McINTIRE  2,751,212
PEBBLE HEAT EXCHANGE CHAMBER
Filed Dec. 26, 1951                                 2 Sheets-Sheet 2

INVENTOR.
R.L. MC INTIRE
BY Hudson and Young
ATTORNEYS 2,751,212
Patented June 19, 1956

2,751,212
PEBBLE HEAT EXCHANGE CHAMBER

Robert L. McIntire, Bartlesville, Okla., assignor to Phillips Petroleum Company, a corporation of Delaware Application December 26, 1951, Serial No. 263,142

11 Claims. (Cl. 263—19)

This invention relates to pebble heaters. In one of its more specific aspects, it relates to improved reaction chambers of pebble heater apparatus. In another of its more specific aspects, it relates to a method of regulating pebble flow through pebble heater apparatus. In another of its more specific aspects, it relates to a method for removing pebble fines from pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between ¼ inch and ⅜ inch are preferred. The pebbles must be formed of refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1800° F. to 3000° F. are desirable.

One disadvantage of conventional pebble chambers containing relatively shallow beds is that the pebbles tend to flow more rapidly through portions of the pebble bed in direct alignment with the pebble outlet conduit or conduits than they do through portions of the pebble bed laterally disposed from alignment with such pebble outlet conduits. As a result of this performance of pebble heat exchange chambers, there is a diversity in the temperature of pebbles in different portions of any given cross sectional area of the pebble bed. This diversity of temperature is partly due to the difference in residence time of pebbles in any particular section of the pebble bed. The pebbles flowing at a faster rate give up less of their heat to gaseous materials passed in direct heat exchange therewith than do pebbles gravitating at a slower rate.

Another disadvantage of conventional pebble heater apparatus is that as the pebbles gravitate through the apparatus the pebbles are abraded with the result that pebble fines build up in the system. These pebble fines, together with smaller sized pebble particles, tend to flow directly downward from the pebble inlet conduit. In contrast thereto, the larger, substantially spherical particles tend to roll downwardly over the surface of the pebble bed away from the pebble inlet conduit, thus tending to assume the normal angle of repose as the shape of the top of the pebble bed. Thus, in the normal operation of a pebble chamber, a separation and concentration of the fines and whole pebbles is normally attained within the reactor or heating chamber.

Each feed to a reactor chamber of a pebble heater apparatus has different characteristics. In particular, these characteristics cause different temperature gradients across the surface of the pebble bed within the reactor. This is the case regardless of whether a single pebble inlet or multiple inlets are provided in the reactor. Thus, a reactor which is designed to crack normal butane (with a heat of reaction of about 850 B. t. u./lb.) will have a smaller temperature gradient across the top of the bed than the same reactor will have when it is converted to cracked ethane (with a heat of reaction of about 2100 B. t. u./lb.).

The same reactor will thus necessarily have to be modified somewhat in order to obtain the most efficient cracking of both feeds. It should also be noted that any reactor which is designed and placed in operation for the first time will also require some adjustment to bring about the most efficient operation thereof. My invention makes possible the modification of such pebble heat exchange chambers in a rapid and feasible manner.

By at least one aspect of this invention, at least one of the following objects of the invention is attained. An object of this invention is to provide improved means for thermally treating or reacting gaseous materials. Another object of the invention is to provide improved means for controlling pebble flow through pebble heater apparatus. Another object of the invention is to provide means for controlling the flow of pebbles through a pebble heat exchange chamber so as to obtain a lower temperature gradient across the top of the pebble bed within that chamber. Another object of the invention is to provide improved means for removing pebble fines from pebble heater apparatus. Another object of the invention is to provide a method for obtaining more uniform cracking of hydrocarbon materials in a pebble reactor chamber. Other and further objects of the invention will be apparent upon study of the accompanying disclosure.

Broadly speaking, this invention resides in the improvement in pebble heat exchange chambers which comprises a plurality of pebble feeders so placed as to control gravitation of specific portions of pebbles from the lower portion of the reactor chamber. In one specific embodiment of this invention, an outlet or a plurality of outlets are provided in the lower portion of the reactor chamber and substantially vertically aligned with the pebble inlet conduit or conduits to that chamber so as to collect and draw off that portion of the pebble bed remaining vertically aligned with such inlet conduit. This draw-off conduit is provided with a separate feeder device for the purpose of controlling the rate of solid material flow from the reactor chamber through that draw-off conduit.

Figure 2:
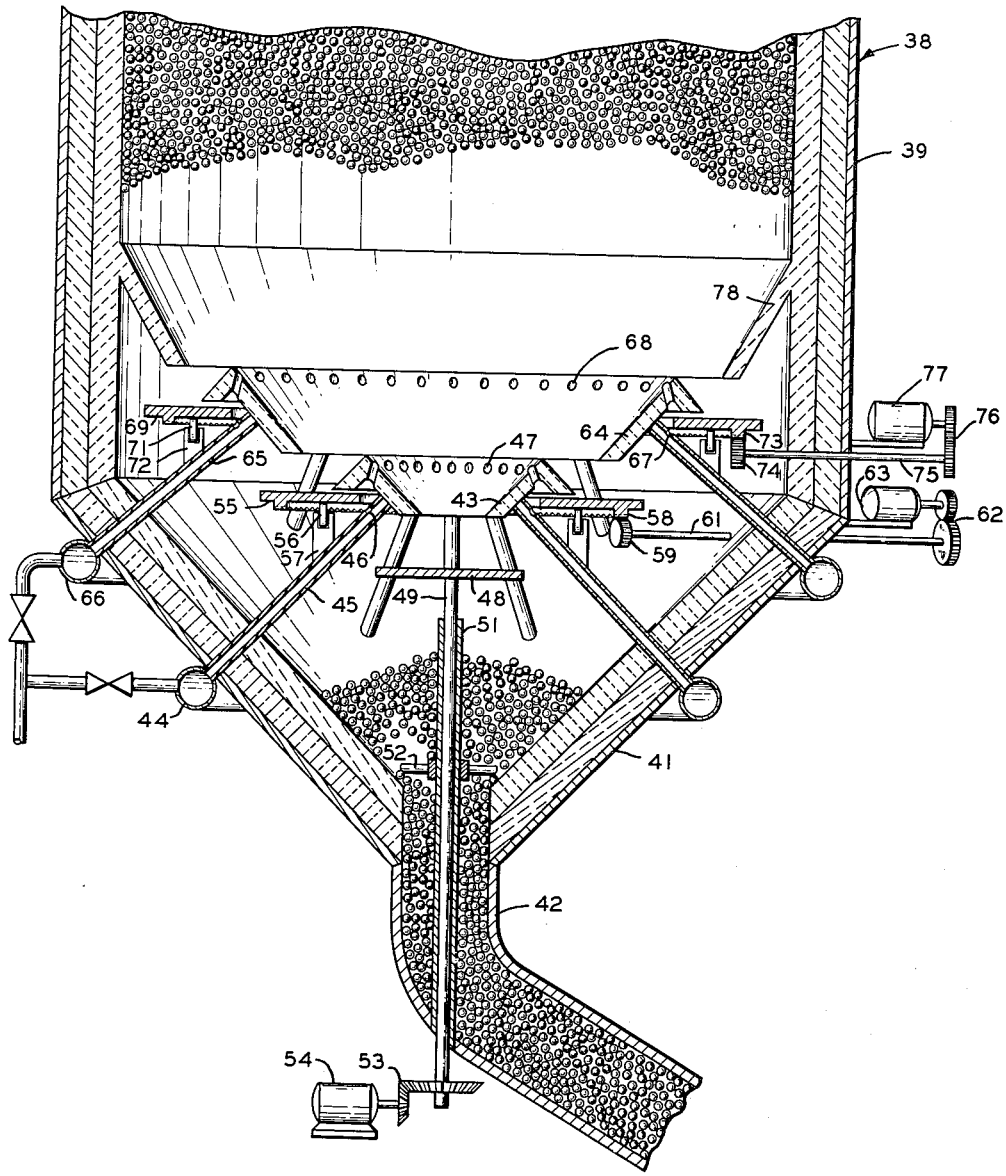

Better understanding of this invention will be apparent upon study of the diagrammatic drawings in which Figure 1 is a vertical section of a pebble chamber provided with a pebble fines draw-off in a chamber utilizing a single centrally disposed pebble inlet conduit. Figure 2 is a sectional view of a pebble chamber provided with a plurality of pebble feeders in the lower portion thereof. Figure 3 is a diagrammatic view of a pebble heater apparatus.

Referring particularly to the device shown in Figure 1 of the drawings, pebble heat exchange chamber 11 comprises upright, elongated shell 12 closed at its upper and lower ends, the lower end being shown as closed by member 13. This pebble heat exchange chamber is devised so as to be provided with a centrally disposed pebble inlet conduit, not shown. Pebbles fines collector member 14 which is annular or ring-like is centrally disposed in the lower end portion of chamber 11 and is spaced above pebble outlet conduit 15 which is also centrally disposed and is provided in the bottom of closure member 13. Pebble conduit 16 is connected to the lower end of pebble fines collector member 14 and preferably extends transversely through one side of closure member 13 to a pebble feeder chamber 17. This pebble feeder can be any of the conventional type pebble feeders such as a star valve, a gate valve, a vibratory feeder, a rotatable table feeder, or the like. For the purpose of explanation, a rotatable table feeder 18 is provided within chamber 17 and spaced below the outlet end of conduit 16. Table 18 is supported by means of drive shaft 19 extending upwardly through the lower end of chamber 17, this shaft extending through a conventional packing gland in that lower end of chamber 17. Suitable drive means, such as gears 21 and motor 22, are connected to shaft 19 for the purpose of rotating table 18 at any desired rate. Pebble conduit 23 extends from the lower end portion of chamber 17 upwardly into separator chamber 24. Lift-gas inlet conduit 25 is provided in the lower end portion of conduit 23 and downstream of chamber 17. Conduit 23 extends upwardly a spaced distance into separator chamber 24 which is of somewhat larger cross section than conduit 23. Outlet conduit 26 is provided in the upper end portion of separator 24 so as to permit the escape of lift-gas and entrained pebble fines therethrough. Pebble conduit 27 extends downwardly from the lower end portion of separator chamber 24 to convey larger pebbles from the separator chamber to the major stream of pebbles from chamber 11.

Gaseous material inlet means 28 preferably comprises a header member which is connected to the interior of chamber 11 by means of conduit supports 29 extending through closure member 13 to pebble fines collection member 14. Conduit supports 29 are preferably provided with perforations 31 in their lower sides so as to permit the escape of gaseous material into the lower portion of the pebble mass within chamber 11.

Pebble outlet conduit 15 extends downwardly from closure member 13 and is connected to a pebble feeder which like feeder 17 may be any one of the conventional types of pebble feeders. For the purpose of explanation, pebble outlet conduit 15 extends downwardly into pebble feeder chamber 32, which chamber contains a rotatable table feeder 33 spaced downwardly from the lower end of conduit 15. Table 33 is supported on a drive shaft 34 extending upwardly through the lower end of chamber 32. Drive shaft 34 is operatively connected to drive means such as gears 35 and motor 36. Pebble outlet conduit 37 extends downwardly from the lower end portion of feeder 32 and is connected to a pebble elevator, not shown. Pebble conduit 27 is connected to pebble conduit 37 preferably at about the outlet end of feeder 32.

Referring particularly to the device shown in Figure 2 of the drawings, pebble heat exchange chamber 38 comprises upright, elongated shell 39 closed at its upper and lower ends, and as shown, the lower end is closed by closure member 41. Pebble chamber 38 may have either a single centrally disposed pebble inlet conduit in its upper end or a plurality of pebble inlet conduits uniformly spaced around the top of the chamber intermediate the axis and the periphery thereof. Pebble outlet conduit 42 extends downwardly from the bottom of closure member 41. Collector member 43 is provided in the central portion of chamber 38 and is spaced above pebble outlet conduit 42. Collector member 43 is similar to pebble fines collector member 14 discussed in connection with Figure 1. This member is preferably annular and of inverted-V cross section. Gaseous material inlet means 44 comprises a header member extending about closure member 41 and connected to the lower side of collector member 43 by means of conduits 45. Conduits 45 are preferably provided with outlets 46 adjacent the lower side of collector member 43. Outlet openings 47 are uniformly spaced about the upper end portion of collector member 43 so as to permit the escape of gaseous material from below member 43 into the pebble mass thereabove. Rotatable table 48 is spaced below the lower end of annular collector member 43 and is rotatably supported in position by means of drive shaft 49 which extends upwardly through the lower end of chamber 38. Shaft 49 is supported by bushing 51 and support members 52, the support members extending between bushing 51 and closure member 41. Drive shaft 49 is connected to drive means such as gears 53 and motor 54.

Annular rotatable table 55 is rotatably mounted on rollers 56 which are in turn mounted on support members 57 supported by conduits 45. Annular table 55 is provided with a gear race 58 on its lower side so as to permit pinion 59 to mesh therewith. Pinion 59 is supported and driven by means of drive shaft 61 which extends through the side of shell 39 and is connected to drive means such as gears 62 and motor 63. Annular table 55 is larger in inner diameter than the intermediate portion of collector member 43 and is considerably larger in diameter than the largest diameter of collector 43. Table 55 is positioned immediately below the overhanging outer lip of the inverted-V of collector member 43.

Collector member 64 is an annular, preferably inverted-V type member, smaller in inner diameter than the outer diameter of table 55 but preferably having a considerably larger outer diameter than the outer diameter of collector member 43. Collector member 64, like collector member 43, is supported on conduits 65 extending through closure member 41 from header member 66. Conduits 65 are provided with outlets 67 adjacent the lower side of collector member 64. Outlets 68 are uniformly spaced along the upper rim of member 64 so as to permit the escape of gaseous materials from below that member into the pebble mass thereabove. Annular table 69 is similar to table 55, being supported by rollers 71 which are in turn supported by support members 72 extending upwardly from conduit members 65. Table 69 is also provided with a gear race 73 which meshes with pinion 74. Pinion 74 is mounted on and driven by drive shaft 75 which extends through the side of shell 39 and is connected to drive means such as gears 76 and motor 77. Table 69 is larger in inner diameter than the intermediate portion of collector member 64 but is preferably smaller in inner diameter than the largest diameter of collector member 64. Table 69 is positioned on a level intermediate the ends of collector member 64 and spaced immediately below the lower end of the outer lip of that collector member. Baffle member 78 is smaller in inner diameter than the outer diameter of table 69 and is considerably larger in outer diameter than the outer diameter of collector member 64. Baffle member 78 extends downwardly and inwardly from the wall of shell 39 to a position over table 69.

Although Figure 2 has been specifically described with only three table feeders, more or fewer such feeders can be used as desired. The feature of the annular pebble feeders of Figure 2 can also be substituted for feeder 32 of the device of Figure 1 and the pebble fines take-off of Figure 1 substituted for the table feeder shown in Figure 2.

Referring particularly to the device shown in Figure 3 of the drawings, pebble heater chamber 79 is an upright chamber, closed at its upper and lower ends by closure members 81 and 82, respectively. Pebble inlet conduit 83 extends into the upper end portion of chamber 79, and although shown as a single pebble inlet centrally positioned therein, may be a plurality of conduits uniformly spaced over the top of that chamber. Gaseous effluent conduit 84 extends from the upper end of chamber 79 and heating material inlet conduit 85 is connected to the lower end of that chamber. For the purpose of simplicity, the second chamber of this apparatus has been shown as the chamber of Figure 1 of the drawings and like numerals designate like parts in these figures. Pebble conduit 86 extends from the lower end of chamber 79 to the upper end portion of chamber 11. Although shown as a single pebble conduit in this specific modification, it is within the scope of this invention that the pebble conduit means may be a plurality of pebble conduits extending between the lower end of chamber 79 and the upper end of chamber 11. Gaseous effluent conduit 87 is provided in the upper end portion of chamber 11 and analyzer 88 is connected to effluent conduit 87 by means of conduit 89. Conduit 37 extends from the lower end portion of feeder 32 into separator chamber 91 disposed at a level above the upper end of chamber 79. Lift-gas inlet conduit 92 is connected to pebble conduit 37 downstream of feeder 32 and in the lower end of conduit 37. Separator chamber 91 is provided with effluent conduit 93 in its upper end portion and is connected at its lower end to pebble conduit 83. Although a gas lift has been described in connection with this pebble heater system, it is within the scope of this invention that a mechanical pebble lift such as a screw conveyor or a bucket type elevator may be utilized.

In the operation of the device shown in Figure 3 of the drawings, pebbles are introduced into the upper portion of chamber 79 and gravitate as a contiguous gas pervious pebble mass downwardly through that chamber, through pebble conduit 86, and chamber 11 to the particular feeder controlling flow of each particular portion of that pebble mass in chamber 11. Gaseous heating material, which may be in the form of fuel and air to be burned on the surface of the pebbles within chamber 79 or in a separate combustion chamber in the lower portion of chamber 79, or which may be in the form of hot combustion gases is introduced into the lower portion of chamber 79 through inlet means 85. The hot gaseous heat exchange material is passed upwardly through the gravitating pebble mass within chamber 79 in direct heat exchange therewith and raises the temperature of those pebbles to about 100° to 200° above the desired pebble inlet temperature for the reaction chamber. Gaseous effluent is removed from the upper end portion of chamber 79 through gaseous effluent conduit 84. Hot pebbles from chamber 79 gravitate downwardly through chamber 11 and gaseous materials to be heated in chamber 11 are introduced into the lower portion of that chamber through inlet means 28. The gaseous material passes upwardly through the gravitating pebble mass within chamber 11 and is raised to the desired temperature by direct heat exchange with the hot pebbles. When the gaseous materials heated within chamber 11 are hydrocarbons which are cracked or reformed, the gaseous effluent removed from chamber 11 through effluent conduit 86 is sampled and analyzed in analyzer 88. The speed of operation of pebble feeders 17 and 32 or in the case of Figure 2 feeders 48, 55, and 69 are adjusted so as to slow down the flow of those pebbles normally gravitated at the highest rate and to obtain a more rapid flow of pebbles which normally flow at a slower rate. In this maner a more uniform temperature throughout any given cross section of the reactor chamber is obtained.

Referring once again to the specific device shown in Figure 3, the pebbles flowing through the central portion of chamber 11 are removed from that chamber through collector member 14 and conduit 16. The rate of removal of these pebbles and the pebble fines concentrated in that portion of the pebble bed is controlled by the rate of rotation of table 18 of feeder 17. As pebbles are fed through feeder 17 they are entrained by a stream of lift gas introduced through conduit 25. The pebble-containing gas stream passes through conduit 23 into separator chamber 24. The pebble fines are so light that they are continuously entrained in the gas stream which flows from separator chamber 24 through outlet conduit 26 and are discarded from the system. The larger pebbles are of such size and weight that they settle from the gas stream in separator chamber 24 and gravitate through conduit 27 into the main stream of pebbles flowing through conduit 37.

The main stream of pebbles removed from chamber 11 through pebble outlet conduit 15, not shown, and feeder 32 gravitate downwardly through conduit 37 and are entrained with a stream of lift-gas near the lower end of that conduit and are elevated to separator chamber 91. The lift gas and pebbles are separated in separator chamber 91, the lift-gas escaping through effluent conduit 93 and the pebbles gravitating through conduit 83 into the upper end portion of pebble chamber 79.

It is within the contemplation of this invention that closer control of flow of pebbles through the pebble feeders may be obtained by regulating the spacing of tables 18, 33, and 48 from the lower ends of the respective pebble conduits so as to obtain the best operation. As pointed out above, any type of pebble feeder can be used in connection with this pebble feeder system.

It is also within the contemplation of this invention that the central pebble baffle be a disc with a lip depending from its circumference. The other baffles can then be disposed on the same horizontal plane and annular table feeders mounted below the openings between the baffles. Such construction, when mounted in the lower end of a flat-bottomed chamber would still assure uniform pebble flow throughout the entire bed.

Various other modifications will be apparent to those skilled in the art upon study of the accompanying disclosure. Such modifications are believed to be within the spirit and the scope of this invention.

I claim:

1. Improved pebble heat exchange means comprising in combination a closed, upright, elongated shell; pebble inlet means in the upper end portion of said shell; gaseous effluent conduit means in the upper end portion of said shell; ring-like pebble collector means of predetermined size axially aligned with said pebble inlet means and disposed in the lower portion of the chamber formed within said shell spaced apart from the walls of said shell, the opening therethrough forming at least a portion of pebble conduit means extending downwardly from the chamber section above said collector means and axially aligned with said pebble inlet means; collector supports extending between the lower end of said shell and said collector means; a pebble flow control means operatively disposed immediately below the outlet of said pebble conduit means; at least one additional pebble flow control means operatively disposed below at least one additional pebble conduit formed in the lower portion of said chamber, said additional pebble conduit being adapted to convey pebbles from the chamber section other than that axially aligned with said pebble inlet means and above said collector means; gaseous material inlet means in the lower end portion of said shell; and common pebble outlet conduit means connected to the downstream ends of said pebble flow control means, said flow control means being independently regulatable.

2. An improved pebble heat exchange means comprising in combination a closed, upright, elongated shell; pebble inlet means in the upper end portion of said shell; gaseous effluent conduit means in the upper end portion of said shell; pebble collector means of predetermined size axially aligned with said pebble inlet means and disposed in the lower portion of said shell, said collector means having its peripheral walls spaced from the walls of said shell; collector supports extending between the lower end of said shell and said pebble collector means; a pebble conduit extending downwardly and outwardly from an opening through said collector means through the side of said shell; a first pebble flow control means operatively connected to said pebble conduit; a separator chamber; a second pebble conduit extending from the lower end of said first pebble flow control means upwardly into said separator chamber; a lift-gas inlet conduit connected to the lower end of said second pebble conduit; gaseous effluent conduit means extending from the upper end portion of said separator chamber; a pebble outlet conduit connected to the lower end portion of said shell; a second pebble flow control means operatively connected to said pebble outlet conduit, each of said first and second pebble flow control means being independently regulatable so as to permit independent control of flow of vertical pebble portions through said shell; pebble outlet means extending from the lower end portion of said second pebble flow control means; a third pebble conduit extending from the lower end portion of said separator chamber to said pebble outlet conduit means from said second pebble flow control means; and gaseous material inlet means in the lower end portion of said shell.

3. The pebble heat exchange means of claim 2 wherein said pebble inlet means in the upper end portion of said shell is a centrally positioned pebble conduit; and said pebble collector means is an annular member having an inverted-V cross section.

4. The pebble heat exchange means of claim 3 wherein said collector supports are tubular and are provided with outlets spaced along their lengths in the lower side thereof; and a gaseous material header is connected to the lower ends of said collector supports.

5. Improved pebble heat exchange means comprising in combination a closed, upright, elongated shell; pebble inlet means in the upper end portion of said shell; geseous effluent conduit means in the upper end portion of said shell; pebble outlet means in the lower portion of said shell; a ring-like baffle axially and transversely disposed in the lower portion of the chamber formed within said shell and spaced above said pebble outlet means; baffle supports extending between the lower end of said shell and said baffle; a table feeder operatively disposed below the opening in said baffle and spaced above said pebble outlet means; at least one annular table feeder, larger in diameter than said baffle, laterally disposed within the lower end portion of said chamber and spaced above said pebble outlet means; and gaseous material inlet means in the lower portion of said shell.

6. The pebble heat exchange means of claim 5 wherein said pebble baffle is annular and of inverted-V cross section; a first annular table feeder, smaller in inner diameter than the outer diameter of said baffle and considerably larger in outer diameter than the outer diameter of said baffle, rotatably disposed immediately below the outer lip of said baffle; a gaseous material inlet header about the lower end of said shell; and said baffle supports being tubular, connected at their lower ends to said header and being provided with gaseous material outlets in their upper ends.

7. The pebble heat exchange means of claim 6 wherein a second annular pebble of inverted V cross section is provided within the lower end of said chamber and above said annular table feeder, said second baffle being smaller in diameter than the outer diameter of said table feeder but considerably larger in inner diameter than the outer diameter of said first pebble baffle; baffle supports extending between the lower ends of said shell and said second baffle; and a second annular table feeder, smaller in inner diameter than the outer diameter of said second baffle and considerably larger in outer diameter than the outer diameter of said pebble baffle, rotatably disposed immediately below the outer lip of said second baffle.

8. The pebble heat exchange means of claim 7 wherein said baffle supports extending to said second baffle are tubular, and are provided with gaseous material outlets in their upper ends; and a gaseous material header connected to the lower ends of said supports extending to said second baffle.

9. The pebble heat exchange means of claim 8 wherein a third pebble baffle smaller in inner diameter than the outer diameter of said second annular table feeder is disposed above said table feeder in the lower portion of said chamber and extends downwardly and inwardly from said shell.

10. The pebble heat exchange means of claim 9 wherein said first and second baffle members are provided with gaseous material outlets uniformly spaced about their upper end portions.

11. An improved process for removing pebble fines from pebble heater apparatus during operation which comprises separately withdrawing a fines-containing stream of pebbles from within the lower portion of the lowermost chamber of said apparatus; controlling the rate of withdrawal of the fines-containing stream in relation to the rate of withdrawal of the remaining said pebbles; entraining said fines-containing stream of pebbles in a stream of gaseous material; passing said entrained material into a separation zone at such a rate as to maintain entrainment of the pebble fines and to permit the larger pebbles to settle out; gravitating the larger pebbles from the lower end of said separation zone and combining them with said remaining pebbles withdrawn from said chamber; withdrawing said fines and entraining gas from said separation chamber; and elevating the combined pebble stream to the upper portion of said pebble heater apparatus.

References Cited in the file of this patent

UNITED STATES PATENTS

| | | |
|---|---|---|
| 2,432,873 | Ferro et al. | Dec. 16, 1947 |
| 2,468,712 | Kohler | Apr. 26, 1949 |
| 2,530,274 | Weber | Nov. 14, 1950 |
| 2,555,210 | Waddill et al. | May 29, 1951 |
| 2,590,202 | Norton | Mar. 25, 1952 |
| 2,614,823 | Berkemeyer | Oct. 21, 1952 |